(12) United States Patent
Toskala et al.

(10) Patent No.: US 9,154,288 B2
(45) Date of Patent: Oct. 6, 2015

(54) APPARATUS AND METHOD FOR ALLOCATING RESOURCES FOR COORDINATED TRANSMISSIONS FROM MULTIPLE CELLS

(75) Inventors: Antti Anton Toskala, Espoo (FI); Harri Kalevi Holma, Helsinki (FI)

(73) Assignee: Nokia Solutions and Networks Oy, Espoo (FI)

( * ) Notice: Subject to any disclaimer, the term of this patent is extended or adjusted under 35 U.S.C. 154(b) by 126 days.

(21) Appl. No.: 14/007,351

(22) PCT Filed: Mar. 25, 2011

(86) PCT No.: PCT/EP2011/054626
§ 371 (c)(1),
(2), (4) Date: Nov. 21, 2013

(87) PCT Pub. No.: WO2012/130272
PCT Pub. Date: Oct. 4, 2012

(65) Prior Publication Data
US 2014/0071958 A1    Mar. 13, 2014

(51) Int. Cl.
*H04L 5/00* (2006.01)
*H04W 72/12* (2009.01)
*H04B 7/02* (2006.01)

(52) U.S. Cl.
CPC .............. *H04L 5/0078* (2013.01); *H04L 5/006* (2013.01); *H04W 72/121* (2013.01); *H04B 7/022* (2013.01)

(58) Field of Classification Search
None
See application file for complete search history.

(56) References Cited

U.S. PATENT DOCUMENTS

| | | | |
|---|---|---|---|
| 2008/0075033 A1* | 3/2008 | Shattil | 370/328 |
| 2008/0219219 A1* | 9/2008 | Sartori et al. | 370/335 |
| 2009/0262678 A1* | 10/2009 | Oyman et al. | 370/315 |
| 2010/0177717 A1* | 7/2010 | Sung et al. | 370/329 |
| 2010/0265842 A1* | 10/2010 | Khandekar et al. | 370/252 |
| 2011/0292895 A1* | 12/2011 | Wager et al. | 370/329 |
| 2012/0033571 A1* | 2/2012 | Shimezawa et al. | 370/252 |
| 2012/0113831 A1* | 5/2012 | Pelletier et al. | 370/252 |
| 2014/0010169 A1* | 1/2014 | Novak et al. | 370/329 |

FOREIGN PATENT DOCUMENTS

WO    WO 2009/084921 A2    7/2009

OTHER PUBLICATIONS

3GPP TSG RAN1 #57b, Los Angeles, US, Jun. 29-Jul. 3, 2009, R1-092593, "Consideration on determining cooperative eNBs in Joint Transmission", Pantech & Curitel, 6 pgs.

* cited by examiner

*Primary Examiner* — Kerri Rose
(74) *Attorney, Agent, or Firm* — Harrington & Smith

(57) ABSTRACT

Apparatus and method for communication are provided. The apparatus is configured to receive from an upper scheduler data for user terminals served by the apparatus, wherein a first set of terminals is connected to more than one cell and a second set of user terminals is not connected to more than one cell; receive from an upper scheduler physical layer resources to be allocated for the first set of user terminals; determine physical layer resources for the second set of user terminals and allocate the received and determined resources for the user terminals.

20 Claims, 4 Drawing Sheets

APPARATUS AND METHOD FOR ALLOCATING RESOURCES FOR COORDINATED TRANSMISSIONS FROM MULTIPLE CELLS

FIELD

The exemplary and non-limiting embodiments of the invention relate generally to wireless communication networks and, more particularly, to an apparatus and a method in communication networks.

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

Wireless communication systems are constantly under development. Developing systems provide a cost-effective support of high data rates and efficient resource utilization. One communication system under development is the 3rd Generation Partnership Project (3GPP) Long Term Evolution (LTE). An improved version of the Long Term Evolution radio access system is called LTE-Advanced (LTE-A). The LTE and LTE-A are designed to support various services, such as high-speed data. In most communication systems available transmission capacity is allocated between currently active connections on the basis of the requirements of each connection, available capacity, interference situation and other factors. In addition, properties of the connections, such as the modulation and coding applied in communication are determined. Performing these actions in the most optimal manner is vital to the efficiency of a communication system. This applies especially to situations where coordination of transmissions from multiple cells must be done simultaneously and where the properties of the connections, such as delays in transmissions, are different.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus, comprising: at least one processor and at least one memory including a computer program code, the at least one memory and the computer program code configured to, with the at least one processor, cause the apparatus at least to: receive from an upper scheduler data for user terminals served by the apparatus, wherein a first set of terminals is connected to more than one cell and a second set of user terminals is not connected to more than one cell; receive from an upper scheduler physical layer resources to be allocated for the first set of user terminals; determine physical layer resources for the second set of user terminals and allocate the received and determined resources for the user terminals.

According to an aspect of the present invention, there is provided an apparatus comprising: means for receiving from an upper scheduler data for user terminals served by the apparatus, wherein a first set of terminals is connected to more than one cell and a second set of user terminals is not connected to more than one cell; means for receiving from an upper scheduler physical layer resources to be allocated for the first set of user terminals; means for determining physical layer resources for the second set of user terminals and means for allocating the received and determined resources for the user terminals.

According to an aspect of the present invention, there is provided an apparatus comprising: at least one processor and at least one memory including a computer program code, the at least one memory and the computer program code configured to, with the at least one processor, cause the apparatus at least to: receive from a network element data for user terminals served by a lower scheduler, wherein a first set of terminals is connected to more than one cell and a second set of user terminals is not connected to more than one cell; determine physical layer resources for the first set of user terminals; and send information regarding the determined resources and the received data to the lower scheduler.

According to an aspect of the present invention, there is provided an apparatus comprising: means for receiving from a network element data for user terminals served by a lower scheduler, wherein a first set of terminals is connected to more than one cell and a second set of user terminals is not connected to more than one cell; means for determining physical layer resources for the first set of user terminals; and means for sending information regarding the determined resources and the received data to the lower scheduler.

According to another aspect of the present invention, there is provided a method comprising: receiving from a upper scheduler data for user terminals served by the apparatus, wherein a first set of terminals is connected to more than one cell and a second set of user terminals is not connected to more than one cell; receiving from an upper scheduler data for user terminals served by the apparatus, wherein a first set of terminals is connected to more than one cell and a second set of user terminals is not connected to more than one cell; receiving from an upper scheduler physical layer resources to be allocated for the first set of user terminals; determining physical layer resources for the second set of user terminals and allocating resources for user terminals not connected to more than one base station.

According to another aspect of the present invention, there is provided a method comprising: receiving from a network element data for user terminals served by a lower scheduler, wherein a first set of terminals is connected to more than one cell and a second set of user terminals is not connected to more than one cell; determining physical layer resources for the first set of user terminals; and sending information regarding the determined resources and the received data to the lower scheduler.

LIST OF DRAWINGS

Embodiments of the present invention are described below, by way of example only, with reference to the accompanying drawings, in which FIG. 1 illustrates an example of a radio system;

DESCRIPTION OF SOME EMBODIMENTS

Exemplary embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments of present invention are applicable to any network element, node, base station, relay node, server, corresponding component, and/or to any communication system or any combination of different communication systems that support required functionalities. The communication system may be a wireless communication system or a communication system utilizing both fixed networks and wireless networks. The protocols used and the specifications of communication systems, servers and user terminals, especially in wireless communication, develop rapidly. Such development may require extra changes to an embodiment. Therefore, all words and expressions should be interpreted broadly and are intended to illustrate, not to restrict, the embodiment.

Figure 1:
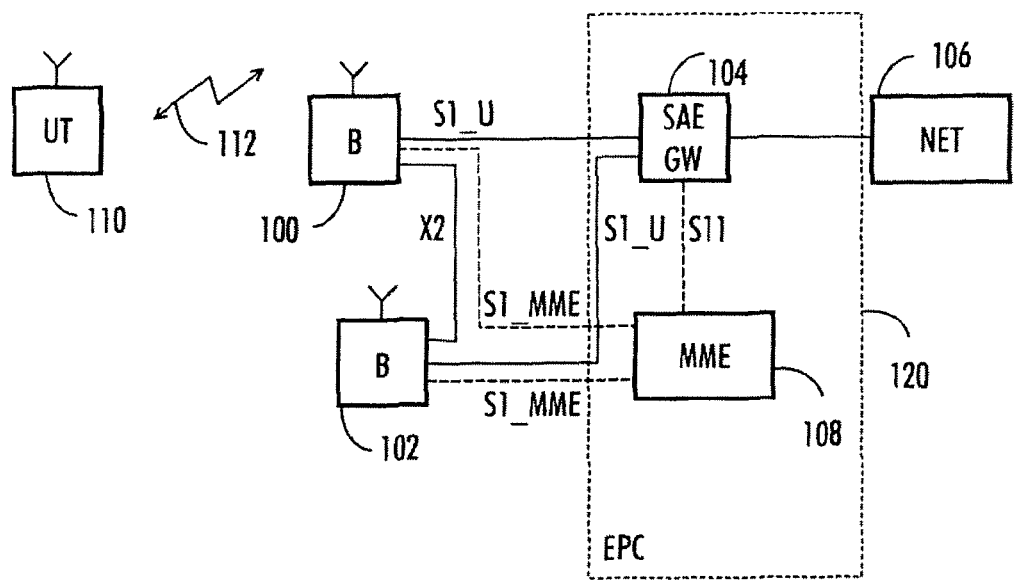

With reference to FIG. 1, let us examine an example of a radio system to which embodiments of the invention can be applied. In this example, the radio system is based on LTE network elements. However, the invention described in these examples is not limited to the LTE radio systems but can also be implemented in other radio systems.

A general architecture of a communication system is illustrated in FIG. 1. FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements, and protocols used in or for group communication are irrelevant to the actual invention. Therefore, they need not be discussed in more detail here.

The exemplary radio system of FIG. 1 comprises an evolved packet core (EPC) 120 of an operator including the following elements: an MME (Mobility Management Entity) 108 and an SAE GW (SAE Gateway) 104. It should be appreciated that the communication system may also comprise other core network elements besides SAE GW 104 and MME 108.

Base stations that may also be called eNodeBs (Enhanced node Bs) 100, 102 of the radio system may host the functions for Radio Resource Management: Radio Bearer Control, Radio Admission Control, Connection Mobility Control, Dynamic Resource Allocation (scheduling). The MME 108 is responsible for distributing paging messages to the eNodeBs 100, 102. The eNodeBs are connected to the SAE GW with an S1_U interface and to MME with an S1_MME interface. The eNodeBs may communicate with each other using an X2 interface. The MME is a control plane for controlling functions of non-access stratum signaling, roaming, authentication, tracking area list management, etc., whereas the SAE GW handles user plane functions including packet routing and forwarding, idle mode packet buffering, etc. The user plane bypasses the MME plane directly to the SAE GW. The SAE GW may comprise two separate gateways: a serving gateway (S-GW) and a packet data network gateway (P-GW). The MME controls the tunneling between the eNodeB and the S-GW, which serves as a local anchor point for the mobility between different eNodeBs, for example. The S-GW may relay the data between the eNodeB and the P-GW, or buffer data packets if needed so as to release them after appropriate tunneling has been established to a corresponding eNodeB. Further, the MMEs and the SAE GWs may be pooled so that a set of MMEs and SAE GWs may be assigned to serve a set of eNodeBs. This means that an eNodeB may be connected to multiple MMEs and SAE GWs, although each user terminal is served by one MME and/or S GW at a time.

FIG. 1 illustrates user terminal UE 110 located in the service area of the eNodeB 100. User terminal refers to a portable computing device. Such computing devices include wireless mobile communication devices, including, but not limited to, the following types of devices: mobile phone, smartphone, personal digital assistant (PDA), handset, laptop computer. The apparatus may be battery powered.

In the example situation of FIG. 1, the user terminal 110 has a connection 112 with the eNodeB 100. The connection 112 may be a bidirectional connection related to a speech call or a data service such as browsing the Internet 106.

FIG. 1 only illustrates a simplified example. In practice, the network may include more base stations and more cells may be formed by the base stations. The networks of two or more operators may overlap, the sizes and form of the cells may vary from what is depicted in FIG. 1, etc.

The embodiments are not restricted to the network given above as an example, but a person skilled in the art may apply the solution to other communication networks provided with the necessary properties. For example, the connections between different network elements may be realized with Internet Protocol (IP) connections.

So called co-operative multipoint transmission (CoMP) may be applied to further enhance the efficiency of the communication network. In CoMP, a user terminal located at a cell border region may be able to receive signals from more than one base station or eNodeB simultaneously. Likewise, the uplink transmission of the user terminal may be received by the base stations. If the resource usage and signaling may be synchronized the performance of user terminal connection may be increased.

In addition, joint processing CoMP may be utilized. Joint processing is based on transmission from multiple base stations with active interference cancellation at the receiving end.

Figure 2:
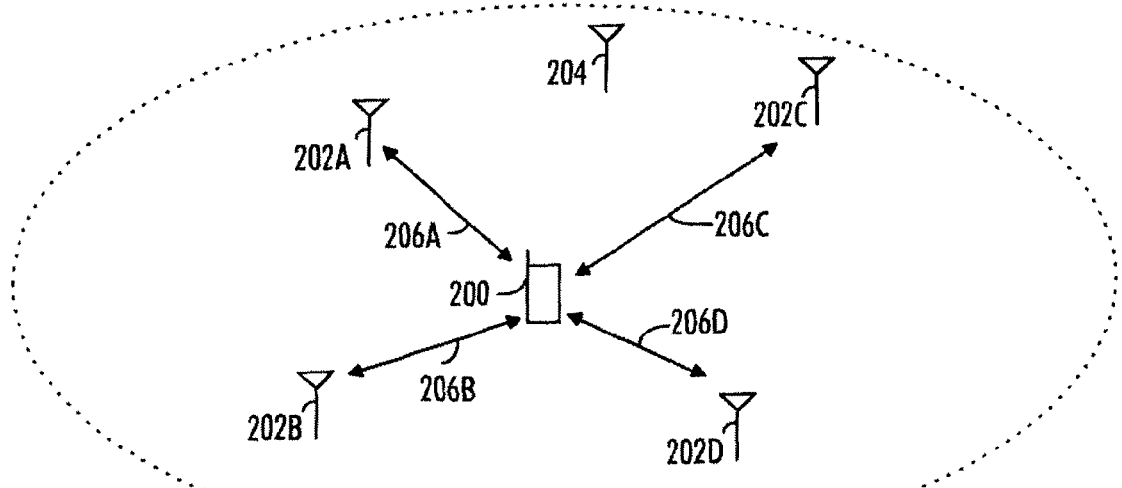
FIG. 2 illustrates an example of a network employing the CoMP transmission.

FIG. 2 shows a network employing the CoMP transmission, according to an embodiment. The figure shows at least one user terminal 200. The UT 200 may be a palm computer, user equipment or any other apparatus capable of operating in a mobile communication network. The network comprises a set of Communication Points/Nodes (CP) 202A to 202D. In a CoMP scheme the Communication Points can be traditional eNodeBs, equipped with one or more antennas and having full base station capabilities or a remote site of a base station hotel. A base station hotel is a configuration where a central unit 204 houses a number of base station equipment which are connected by a network to respective number of remote sites comprising RF transceiver and antennas. The central unit may be integrated to a remote site or it may be a separate unit 204.

The CPs 202A to 202D of the CoMP co-operate with each other via a backhaul link such as a transport medium or an X2 interface as in the specifications of the LTE. Each CP serves its own cell.

In FIG. 2, it is assumed that the UT 200 receives simultaneous downlink transmission from each of the CPs 202A to 202D via wireless communication links 206A to 206D, respectively. The communication links 206A to 206D may apply the orthogonal frequency division multiple access (OFDMA) in the downlink (forward link) and the single carrier frequency division multiple access (SC-FDMA) in the uplink (reverse link), as specified in the LTE. The operating principles are general knowledge to a person skilled in the art and are therefore not disclosed here.

In wireless communication systems, the resources of the wireless links must be allocated to active connections. Typically this is task is performed by a scheduler which is configured to manage the resources and connections of a base station or eNodeB. In LTE, the scheduler typically locates in the eNodeB, or in the case of a base station hotel it may locate in the central unit.

When CoMP is utilized, the different cells of the CPs may have some delays involved in the mutual communication. This causes challenges to deal with the scheduler covering for the coordination of the transmissions from multiple cells. The same applies to responding to the delay requirements needed e.g. for the retransmission needs with 3 ms processing time after receiving an uplink packet (or ACK/NACK for a downlink packet). Therefore, the centralized Layer 2 processing requires that one-way transport delay is below approximately 0.5 milliseconds.

A central scheduler at a central unit (for example at the central unit of a base station hotel) can handle the case described but this requires extremely fast backhaul connection to the equipment handling the cell. Such implementation is very sensitive to the transmission quality and requires high capacity fiber connection (near 10 Gbps) for each cell/sector and is not suited to be used for example with microwave based backhaul connections which are very cost effective.

In an embodiment, the functions of the scheduler are divided into two layers, an upper scheduler and a lower scheduler. The lower scheduler may locate at the eNodeB, CP or remote unit. The lower scheduler is configured to control the scheduling of users not participating in CoMP mode of operation and the retransmissions handling for all users. The users not in the CoMP mode may be users not in the cell edge area thus not having a need for the CoMP assistance or legacy terminals lacking CoMP support.

The upper scheduler may be located at a separate entity covering multiple sites, in one of the eNodeBs in its area or at a central site of a base station hotel configuration. The upper scheduler is configured to send the lower scheduler data packets for all users. In addition, the upper scheduler is configured to determine and send the lower scheduler physical layer resources at time and frequency domain to be used by the terminals utilizing CoMP mode to facilitate suitable combining at the user terminal receiver or single frequency network (SFN) type of operation. In an embodiment, the upper scheduler is configured send the lower scheduler resources for the 1st transmission of each terminal in CoMP mode. The lower scheduler may schedule possible retransmissions by itself. In an embodiment, the upper scheduler may also determine further details such as channel coding rate and modulation to be applied. In another embodiment, the upper scheduler is configured send the lower scheduler resources also for the retransmissions of each terminal in CoMP mode.

In an embodiment, the upper scheduler further informs the lower scheduler the precoding matrix to be used in transmission to a given terminal. The precoding matrix may be provided or indicated from the set of predefined matrixes. This enables the use of same resources by multiple terminals with user specific precoding matrixes.

In an embodiment, the lower scheduler is configured to take care of all time critical aspects of scheduling, such as decisions on modulation, coding details and retransmission handling. The upper scheduler is configured to decide on which user to schedule taking quality of service into account. The upper scheduler takes care of terminals in CoMP mode by ensuring that same resources are reserved for the terminals in each cell the terminals are communicating with. Thus, the proposed solution is suitable regardless of the connection type between different the CPs or eNodeBs and also the central site. The connection type may be fibre, Ethernet or microwave, for example. As the lower scheduler takes care of retransmissions, they do not load the backhaul connections.

Figure 3:
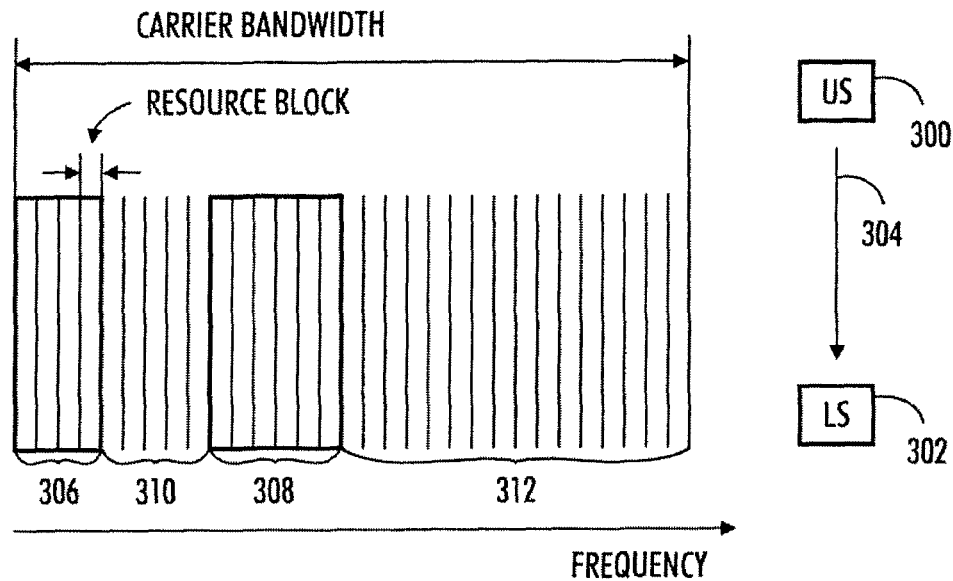
FIGS. 3 and 4 illustrate embodiments of the invention.
Figure 4:
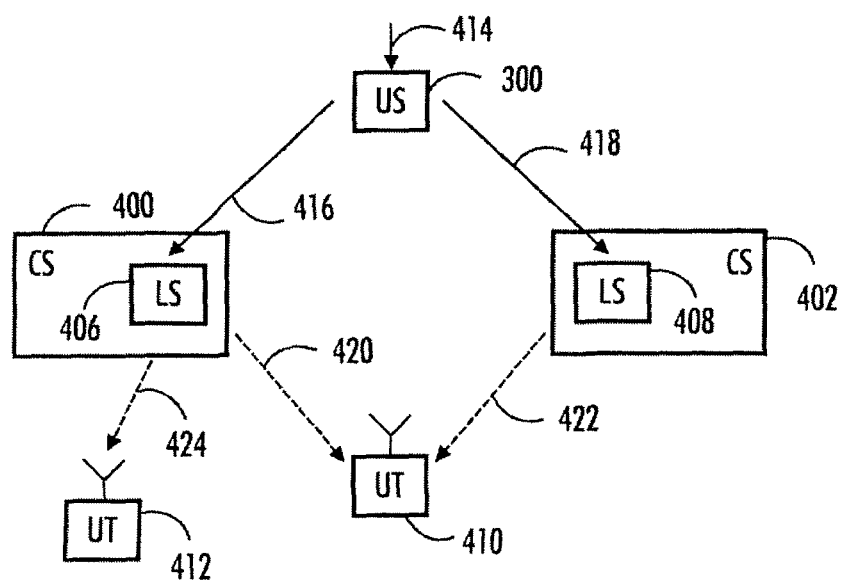

FIGS. 3 and 4 illustrate embodiments of the invention. An upper scheduler 300 is configured to send a lower scheduler 302 data packets 304 of the connections served by the lower scheduler. The packets of the connections of the terminals in CoMP mode comprise resource information. FIG. 3 illustrates an uplink carrier comprising resource blocks. A given number of resource blocks 306, 308 are allocated by the upper scheduler 300 to given user terminal connections for the given Transmission Time Interval TTI. The decisions regarding resources at the upper scheduler 300 may be based on the measurements performed by terminals. Information on the measurements may be forwarded to the upper scheduler. The information may relate to the Channel Quality Information CQI (or channel state information CSI) measurements, handover reports or observation of data throughout, for example. The rest of the resource blocks 310, 312 are left for the lower scheduler 302 to allocate.

FIG. 4 illustrates an example of sending with the same resources from multiple cells to boost cell edge user performance. An upper scheduler serves two CPs or eNodeBs 400, 402. Each CP comprises a lower scheduler 406, 408. The example comprises a user terminal 410 in CoMP mode, receiving transmissions from both CPs 406, 408. In addition, CP 400 serves a user terminal 412 which is not in CoMP mode. The upper scheduler 300 is configured to receive 414 from a network element such as SAE GW (not shown) data for user terminals. The scheduler 300 determines physical layer resources for the user terminal 410 in CoMP mode for facilitating suitable combining at the user terminal 410 and sends information 416, 418 regarding the determined resources and the received data to the lower scheduler 406 of the CP 400 and the lower scheduler 408 of the CP 402. In addition, the upper scheduler sends the data packet related to the connection with user terminal 412 to the lower scheduler 406 of the CP 400. The connections between the upper and lower schedulers may be realized with a wireless or a wired connection. The connection may be a microwave based backhaul connection, for example. The upper scheduler 300 may be configured to determine connection parameters for the connections of user terminals in CoMP mode and send the parameters to the lower schedulers. The connection parameters may comprise channel coding rate and modulation method of the connection, for example.

The lower scheduler 406 of the CP 400 receives from the upper scheduler 300 data packets for user terminals 410 and 412 and the physical layer resources to be allocated for the user terminal 410. The lower scheduler 406 is configured to determine physical layer resources for the user terminal 412.

The lower scheduler 408 of the CP 402 receives from the upper scheduler 300 data packets for user terminals 410 and the physical layer resources to be allocated for the user terminal 410.

The user terminal 410 receives the synchronized transmissions 420, 422 from the CPs 400,402. Likewise, the user terminal 412 receives the transmission 424 from the CP 400.

If the user terminal 410 fails to decode a packet received from the CPs it may request a retransmission from one or more CP. In an embodiment, the CP receiving a retransmission request may determine resources for the retransmissions without coordination from the upper scheduler. The resources for retransmissions may be allocated on the basis of channel quality information received from user terminals, for example.

Figure 5A:
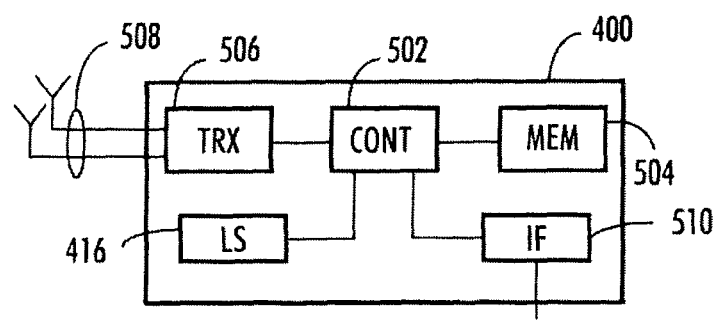
FIG. 5A illustrates an example of a Connection Point or an eNodeB.

FIG. 5A illustrates an example of a Connection Point or an eNodeB, 400. The eNodeB 400 comprises a controller 502 operationally connected to a memory 504. The controller 502 controls the operation of the eNodeB. The memory 504 is configured to store software and data. The eNodeB comprises a transceiver 506 is configured to set up and maintain a wireless connection to user equipment within the service area of eNodeB. The transceiver 506 is operationally connected the controller 502 and to an antenna arrangement 508. The antenna arrangement may comprise a set of antennas. The number of antennas may be two to four, for example. The number of antennas is not limited to any particular number.

The eNodeB may be operationally connected to other network elements of the communication system. The network element may be an MME (Mobility Management Entity), an SAE GW (SAE Gateway), a radio network controller (RNC), another base station or a Connection Point, a central unit comprising an upper scheduler, a gateway, or a server, for example. The eNodeB may be connected to more than one network element. The eNodeB 402 may comprise an interface 510 configured to set up and maintain connections with the network elements.

In an embodiment, the base station comprises a lower scheduler 416 configured to perform resource allocation and other control operations described above either under control of an upper scheduler or independently. The scheduler may be operationally connected to the controller and the memory.

Figure 5B:
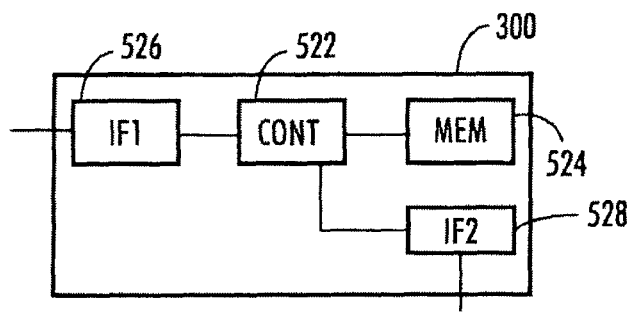
FIG. 5B illustrates an example of an upper scheduler.

FIG. 5B illustrates an example of an upper scheduler 300. The upper scheduler 300 comprises a controller 522 operationally connected to a memory 524. The controller 522 controls the operation of the upper scheduler. The memory 524 is configured to store software and data.

The upper scheduler 300 may be operationally connected to other network elements of the communication system. The network element may be an MME (Mobility Management Entity), an SAE GW (SAE Gateway), a radio network controller (RNC), one or more base station or Connection Points, a gateway, or a server, for example. The upper scheduler may be connected to more than one network element. The eNodeB 300 may comprise one or more interfaces 526, 528 configured to set up and maintain connections with the network elements. The connections may be wireless or wired as described above.

In an embodiment, the base station comprises a lower scheduler 416 configured to perform resource allocation and other control operations described above either under control of an upper scheduler or independently. The scheduler may be operationally connected to the controller and the memory.

In an embodiment, the controller 522 of the upper scheduler 300 is configured to control the interface 526 to receive from a network element data for user terminals served by a lower scheduler, wherein a first set of terminals is connected to more than one cell and a second set of user terminals is not connected to more than one cell. The controller may be configured to determine physical layer resources for the first set of user terminals; and control the interface 528 to send information regarding the determined resources and the received data to the lower scheduler.

Figure 6A:
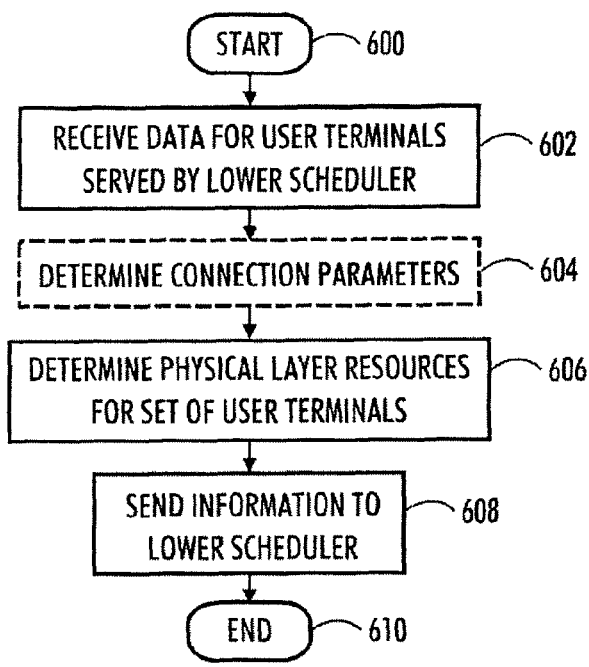
FIGS. 6A and 6B are flowcharts illustrating some embodiments of the invention.
Figure 6B:
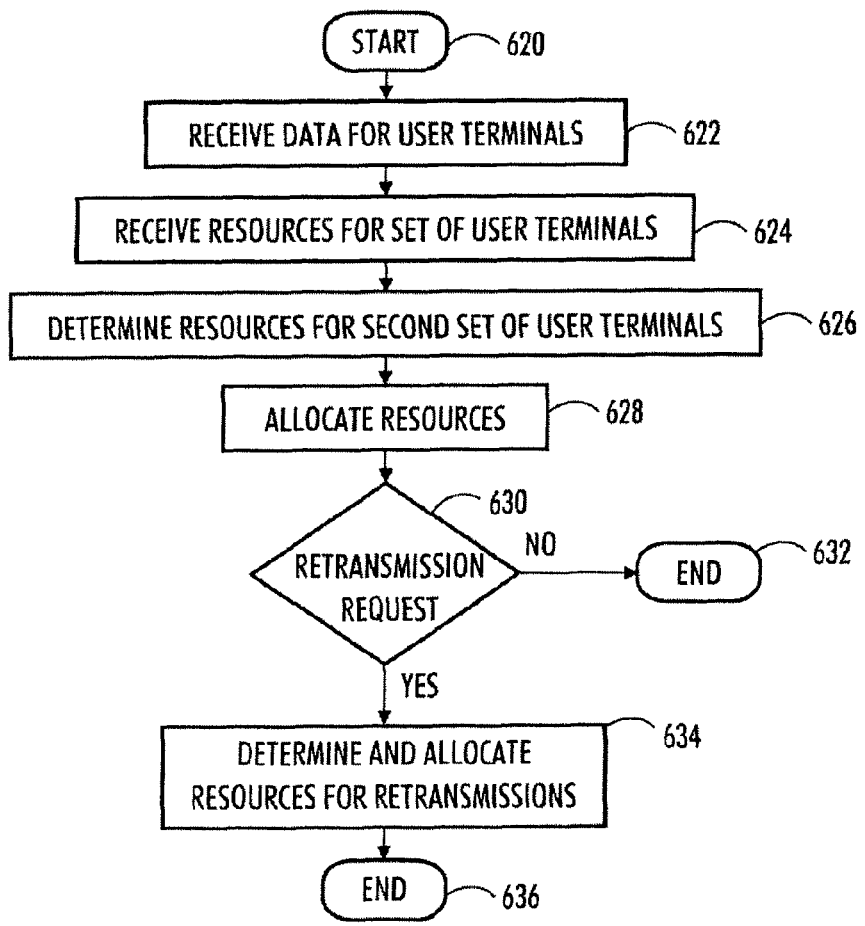

FIGS. 6A and 6B are flowcharts illustrating some embodiments of the invention. FIG. 6A illustrates an embodiment from the upper scheduler point of view. The process starts at step 600.

In step 602, data packets for user terminals served by a lower scheduler are received from a network element. A first set of terminals is connected to more than one cell and a second set of user terminals is not connected to more than one cell. The first set of terminals may be in a CoMP mode of operation.

In an embodiment, connection parameters for the connections of a set of user terminals are determined in step 604. The connection parameters comprise channel coding rate and modulation method of the connection, for example.

In step 606, physical layer resources for the first set of user terminals are determined. The purpose is to facilitate suitable combining at the user terminals utilizing CoMP mode or single frequency network (SFN) type of operation.

In step 608, the received data and information regarding the determined resources is sent to the lower scheduler.

The process ends in step 610.

FIG. 6B illustrates an embodiment from the lower scheduler point of view. The process ends at step 620.

In step 622, data for user terminals served by the lower scheduler is received from an upper scheduler, wherein a first set of terminals is connected to more than one cell and a second set of user terminals is not connected to more than one cell. The first set of terminals may be in a CoMP mode of operation.

In step 624, physical layer resources to be allocated for the first set of user terminals are received from the upper scheduler. In practice, the steps 622 and 624 may happen simultaneously as one skilled in the art is aware.

In step 626, physical layer resources are determined for the second set of user terminals.

In step 628, the received and determined resources are allocated for the user terminals.

The data packets are transmitted by a transmitter to the user terminals.

In an embodiment, if a request for a retransmission is received 630 from a user terminal, resources for the retransmission are allocated in step 634. The process ends at step 636. Otherwise, the process ends at step 632.

The steps and related functions described above and in the attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses able to perform the above-described steps, such as the upper and lower schedulers, may be implemented as an electronic digital computer, which may comprise a working memory (RAM), a central processing unit (CPU), and a system clock. The CPU may comprise a set of registers, an arithmetic logic unit, and a controller. The controller is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as technology advances, the inventive concept can be implemented in various ways. The invention and its embodiments are not limited to the examples described above but may vary within the scope of the claims.

The invention claimed is:

1. An apparatus comprising:
   at least one processor and at least one memory including a computer program code, the at least one memory and the computer program code configured to, with the at least one processor, cause the apparatus at least to:
   receive from an upper scheduler data for user terminals served by the apparatus, wherein a first set of terminals is connected to more than one cell and a second set of user terminals is not connected to more than one cell, wherein the data for user terminals includes first user terminal data and second user terminal data, and wherein a first user terminal of the first set of terminals is configured to receive the first user terminal data as synchronized transmissions from more than one cell and a second user terminal of the second set of user terminals is configured to receive the second user terminal data from a single cell;
   receive from the upper scheduler physical layer resources to be allocated for the first set of user terminals; and
   determine by the apparatus physical layer resources for the second set of user terminals and allocate the received and determined resources for the user terminals
   wherein the apparatus is configured to take care of time critical aspects of scheduling for the user terminals.

2. The apparatus of claim 1, further configured to receive from the upper scheduler physical layer resources to be allocated for a first transmission to user terminals of the first set.

3. The apparatus of claim 1, further configured to allocate resources for retransmissions on the basis of channel quality information received from user terminals.

4. The apparatus of claim 1, further configured to receive from the upper scheduler connection parameters for the connections of the first and second set of user terminals.

5. The apparatus of claim 4, wherein the connection parameters comprise channel coding rate and modulation method of each connection.

6. The apparatus of claim 1, wherein the time critical aspects of scheduling comprises at least one of decisions on modulation, coding details and retransmission handling.

7. An apparatus comprising:
   at least one processor and at least one memory including a computer program code, the at least one memory and the computer program code configured to, with the at least one processor, cause the apparatus at least to:
   receive from a network element data for user terminals served by a lower scheduler, wherein a first set of terminals is connected to more than one cell and a second set of user terminals is not connected to more than one cell, wherein the data for user terminals includes first user terminal data and second user terminal data, and wherein a first user terminal of the first set of terminals is configured to receive the first user terminal data as synchronized transmissions from the more than one cell and a second user terminal of the second set of user terminals is configured to receive the second user terminal data from a single cell;
   determine by the apparatus physical layer resources for the first set of user terminals; and
   send information regarding the determined resources and the received data to the lower scheduler, wherein the lower scheduler is configured to take care of time critical aspects of scheduling for the user terminals.

8. The apparatus of claim 7, further configured to allocate resources for retransmissions for user terminals served by the apparatus.

9. The apparatus of claim 7, further configured to determine connection parameters for the connections of the user terminals.

10. The apparatus of claim 9, wherein the connection parameters comprise channel coding rate and modulation method of the connection.

11. The apparatus of claim 9, further configured to send the information regarding the determined resources of the user terminals of the first set to the lower scheduler of each cell the terminals are connected to.

12. The apparatus of claim 7, further configured to receive information on measurements made by user terminals.

13. The apparatus of claim 12, further configured to determine the physical layer resources on the basis of the information on measurements made by user terminals.

14. The method of claim 12, wherein the time critical aspects of scheduling is at least one of decisions on modulation, coding details and retransmission handling.

15. A method comprising:
    receiving from a upper scheduler data for user terminals served by the apparatus, wherein a first set of terminals is connected to more than one cell and a second set of user terminals is not connected to more than one cell, wherein the data for user terminals includes first user terminal data and second user terminal data, and wherein a first user terminal of the first set of terminals is configured to receive the first user terminal data as synchronized transmissions from the more than one cell and a second user terminal of the second set of user terminals is configured to receive the second user terminal data from a single cell;

receiving from an upper scheduler data for user terminals served by the apparatus, wherein a first set of terminals is connected to more than one cell and a second set of user terminals is not connected to more than one cell;

receiving from the upper scheduler physical layer resources to be allocated for the first set of user terminals;

determining physical layer resources for the second set of user terminals and allocating the received and determined resources for the user terminals wherein the apparatus is configured to take care of time critical aspects of scheduling for the user terminals.

16. The method of claim 15, further comprising: allocating resources for retransmissions for the first and second set of user terminals served by the apparatus.

17. The method of claim 15, further comprising: receiving from the upper scheduler physical layer resources to be allocated for a first transmission of user terminals of the first set.

18. The method of claim 15, further comprising: allocating resources for retransmissions on the basis of channel quality information received from user terminals.

19. The method of claim 15, further comprising: receiving from the upper scheduler connection parameters for the connections of the first and second set of user terminals, wherein the connection parameters comprise channel coding rate and modulation method of each connection.

20. A non-transitory computer readable medium storing a program of instructions, execution of which by a processor configures an apparatus to at least:

receive from an upper scheduler data for user terminals served by the apparatus, wherein a first set of terminals is connected to more than one cell and a second set of user terminals is not connected to more than one cell, wherein the data for user terminals includes first user terminal data and second user terminal data, and wherein a first user terminal of the first set of terminals is configured to receive the first user terminal data as synchronized transmissions from the more than one cell and a second user terminal of the second set of user terminals is configured to receive the second user terminal data from a single cell;

receive from the upper scheduler physical layer resources to be allocated for the first set of user terminals;

determine by the apparatus physical layer resources for the second set of user terminals; and allocate the received and determined resources for the user terminals and take care of time critical aspects of scheduling for the user terminals.

\* \* \* \* \*